(12) United States Patent
Ball

(10) Patent No.: US 12,544,890 B2
(45) Date of Patent: Feb. 10, 2026

(54) PLACARD REMOVING TOOL

(71) Applicant: TL Ball, LLC, Lennon, MI (US)

(72) Inventor: Tracy Ball, Lennon, MI (US)

(73) Assignee: TL Ball, LLC, Lennon, MI (US)

( * ) Notice: Subject to any disclaimer, the term of this patent is extended or adjusted under 35 U.S.C. 154(b) by 540 days.

(21) Appl. No.: 17/951,598

(22) Filed: Sep. 23, 2022

(65) Prior Publication Data

US 2024/0100667 A1   Mar. 28, 2024

(51) Int. Cl.
*B25B 27/14* (2006.01)
*G09F 7/18* (2006.01)
*G09F 7/20* (2006.01)
*G09F 21/04* (2006.01)

(52) U.S. Cl.
CPC ...... *B25B 27/14* (2013.01); *G09F 2007/1865* (2013.01); *G09F 7/20* (2013.01); *G09F 21/048* (2013.01)

(58) Field of Classification Search
CPC .. G09F 2007/1865; G09F 21/048; G09F 7/20; B25B 27/14
USPC .......................................................... 81/484
See application file for complete search history.

(56) References Cited

U.S. PATENT DOCUMENTS

| | | | |
|---|---|---|---|
| 4,325,153 A | 4/1982 | Finnegan | |
| 6,663,082 B1 | 12/2003 | Ploeger | |
| 7,048,255 B2 | 5/2006 | Buch et al. | |
| D792,748 S * | 7/2017 | Yeoh | D8/10 |
| 2014/0305267 A1 | 10/2014 | Baroody | |
| 2016/0183418 A1* | 6/2016 | Vivas | B25B 33/00 29/267 |

FOREIGN PATENT DOCUMENTS

| | | |
|---|---|---|
| DE | 202005000218 U1 | 3/2005 |
| GB | 2019283 A | 10/1979 |

* cited by examiner

*Primary Examiner* — Katina N. Henson
(74) *Attorney, Agent, or Firm* — Dinsmore & Shohl LLP

(57) ABSTRACT

A placard tool including a shaft having a distal end spaced from a proximal end, the shaft including a longitudinal axis A. A handle is positioned at the proximal end of the shaft. An elongated member is positioned at the distal end of the shaft. The elongated member includes a first end and an opposite a second end. The elongated member is offset in a first direction B from the axis A of the shaft defining an unequal length of the elongated member with reference to the axis A on the second end in comparison to the first end. The elongated member is offset in a second direction C from the axis A of the shaft positioning the elongated member on one side with reference to the axis A.

19 Claims, 8 Drawing Sheets

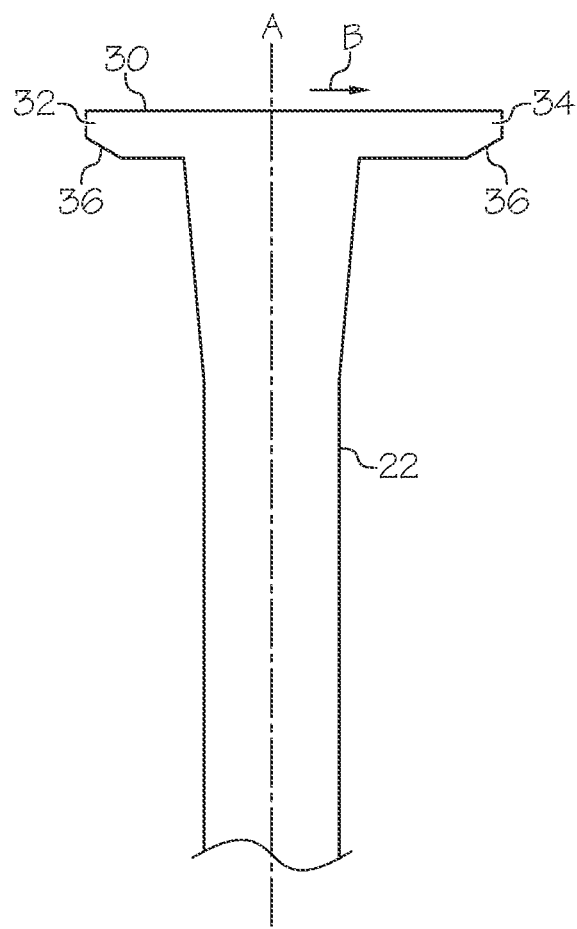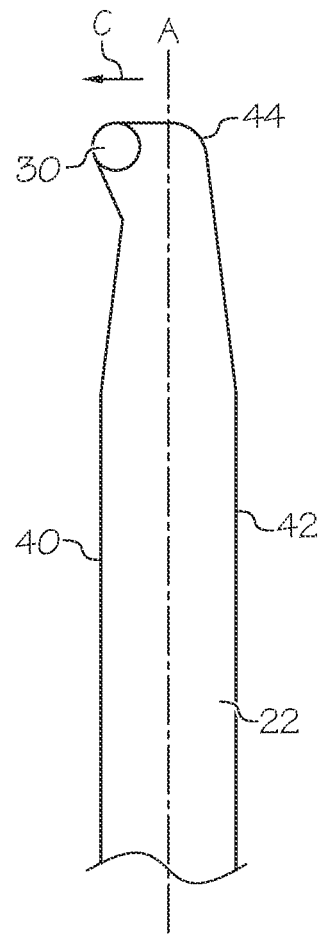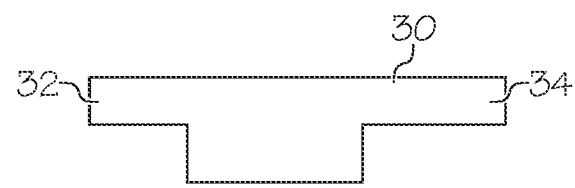

PLACARD REMOVING TOOL

FIELD OF THE INVENTION

The invention relates to tools for changing a placard.

BACKGROUND OF THE INVENTION

As background, semi-trucks and other trucks with containers are required to display placards indicating the type of materials inside of the trailer. The placards are usually arranged within a placard holder and attached via rings that allows a user to flip through and choose a desired placard. Once the desired placard is chosen, the user must then lock the desired placard in the front of the stack to be visible. This is accomplished by sliding the desired placard under a tension member that holds the desired placards.

However, to hold the placards in place while moving, the tension members apply significant force making it difficult to remove the placard to change or flip through when a new desired placard is needed. Typically, a screwdriver is used to try and pry a tab member of the tension member. However, this is difficult to get the correct angle, to pry in certain weather conditions and/or the like. There is therefore a need in the art for a tool that may be utilized to easily change a placard.

SUMMARY OF THE INVENTION

In one aspect there is disclosed, a placard tool including a shaft having a distal end spaced from a proximal end, the shaft including a longitudinal axis A. A handle is positioned at the proximal end of the shaft. An elongated member is positioned at the distal end of the shaft. The elongated member includes a first end and an opposite a second end. The elongated member is offset in a first direction B from the axis A of the shaft defining an unequal length of the elongated member with reference to the axis A on the second end in comparison to the first end.

In another aspect, there is disclosed, a placard tool including a shaft having a distal end spaced from a proximal end, the shaft including a longitudinal axis A. A handle is positioned at the proximal end of the shaft. An elongated member is positioned at the distal end of the shaft. The elongated member includes a first end and an opposite a second end. The elongated member is offset in a second direction C from the axis A of the shaft positioning the elongated member on one side with reference to the axis A.

In a further aspect, there is disclosed, a placard tool including a shaft having a distal end spaced from a proximal end, the shaft including a longitudinal axis A. A handle is positioned at the proximal end of the shaft. An elongated member is positioned at the distal end of the shaft. The elongated member includes a first end and an opposite a second end. The elongated member is offset in a first direction B from the axis A of the shaft defining an unequal length of the elongated member with reference to the axis A on the second end in comparison to the first end. The elongated member is offset in a second direction C from the axis A of the shaft positioning the elongated member on one side with reference to the axis A.

BRIEF DESCRIPTION OF THE DRAWINGS

FIG. 2 is a partial top view of a placard tool;
FIG. 3 is a partial side view of a placard tool;
FIG. 4 is a partial top view of a placard tool.

DETAILED DESCRIPTION OF THE PREFERRED EMBODIMENTS

Figure 1:
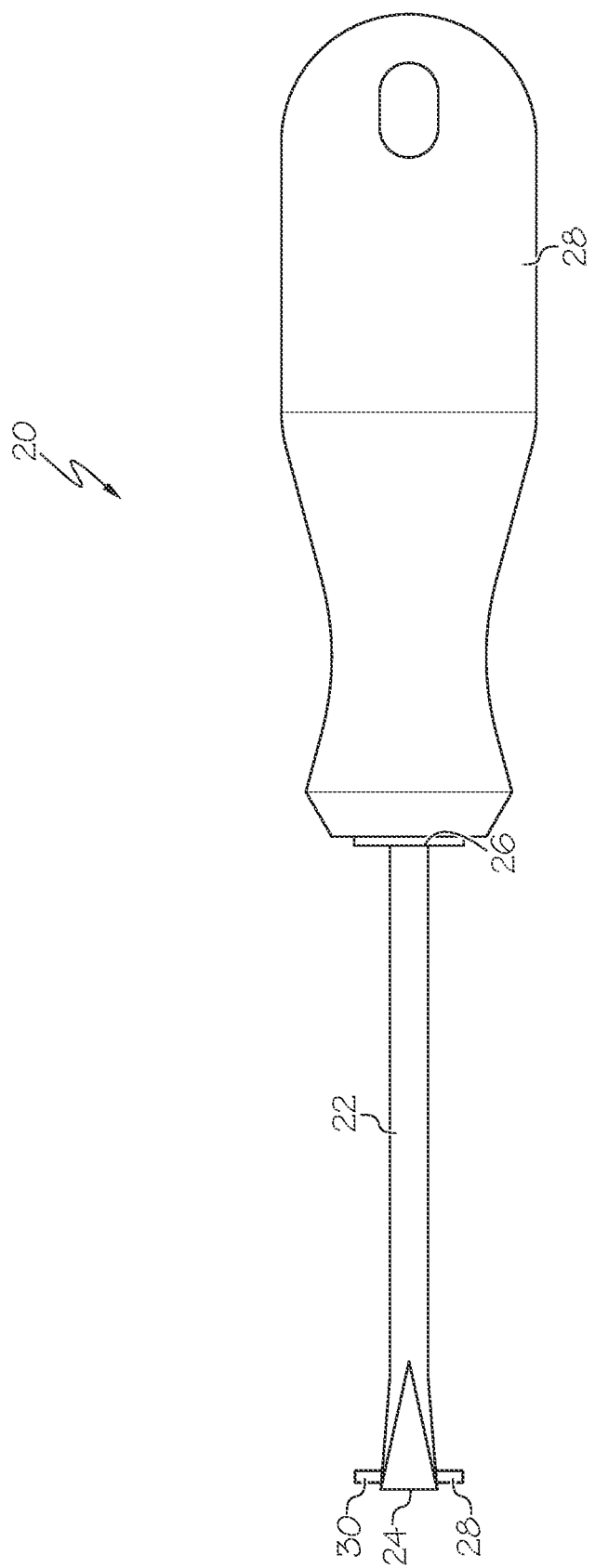
FIG. 1 is a top view of the placard tool.

Referring to FIG. 1, there is shown a placard tool 20. The placard tool 20 includes include a shaft 22 with a distal end 24 and a proximal end 26. A handle 28 is positioned at the proximal end 26. An elongated member 30 is positioned at the distal end 24. The elongated member 30 includes a first end 32 and an opposite a second end 34. The elongated member 30 generally or substantially has a uniform diameter extending from or between the first and second ends 32, 34, respectively. The elongated member 30 is coupled to the distal end 24 of the shaft 22 between the first end 32 and the second end 34 such that the elongated member 30 is positioned perpendicular to an axis A of the shaft 22.

Referring to FIGS. 2 and 4, the elongated member 30 may be offset in a first direction B from the axis A of the shaft 22. This offset configuration in the first direction B defines an unequal length of the elongated member 30 with reference to the axis A on the second end 34 in comparison to the first end 32. The unequal length allows the elongated member 30 to be easily inserted into a pair of clamps 35 as will be discussed in more detail below.

In some embodiments, the elongated member 30 is integrally formed with the distal end 24 of the shaft 22 such that the elongated member 30 and the shaft 22 are a monolithic structure. In other embodiments, the elongated member 30 is coupled to the distal end 24 of the shaft 22 via a weld. In other embodiments, epoxy or other fasteners may be used. In some embodiments, each or both of the first end 32 and the second end 34 include tapers 36, as illustrated in FIG. 2. The tapers 36 may allow easy insertion of the elongated member 30 as will be described in more detail below.

Figure 5:
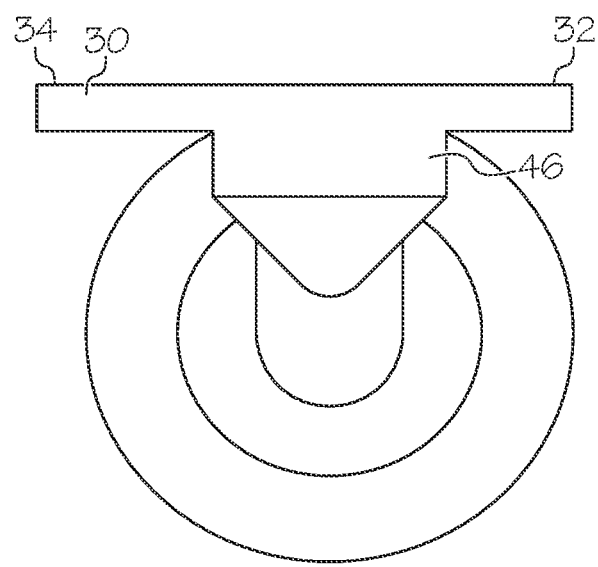
FIG. 5 is an end view of the placard tool.

Referring to FIGS. 3 and 5, the elongated member 30 is offset in a second direction C from the axis A of the shaft 22, as best seen in the side view of FIG. 3. The second offset C provides that the elongated member 30 be positioned on one side of the shaft 22 and not on the axis A. The second offset C is perpendicular to the first direction B, as best seen in FIGS. 2, 3 and 5.

In the depicted embodiment, the elongated member 30 is attached on a first side 40 of the shaft 22 or left of the axis A in the figure. The second side 42 of the shaft 22 or right of the axis A in the figure includes a radius 44 formed thereon. The radius 44 defines a pivot surface 46 for prying as will discussed in more detail below.

Referring to FIGS. 6-10, there is shown views of a placard assembly 48. The placard assembly 48 is normally mounted on a semi-trailer (not shown). The placard assembly 48 includes a plurality of placards 50 that may be selectively displayed to show the cargo within the semi-trailer.

The placard assembly 48 includes at least one latch 52 that includes a contact member 54 that engages the selected placard 50 to hold it in position. In one aspect, the placard assembly may include a plurality of latches 52. The placard assembly 48 also includes a pair of clamps 35 that receive the contact member 54. Each of the pair of clamps 35 include an arcuate portion 56, which forms a recess 58. The contact member 54 applies a tension to the desired placard 50 to hold or retain the placard 50.

Figure 6:
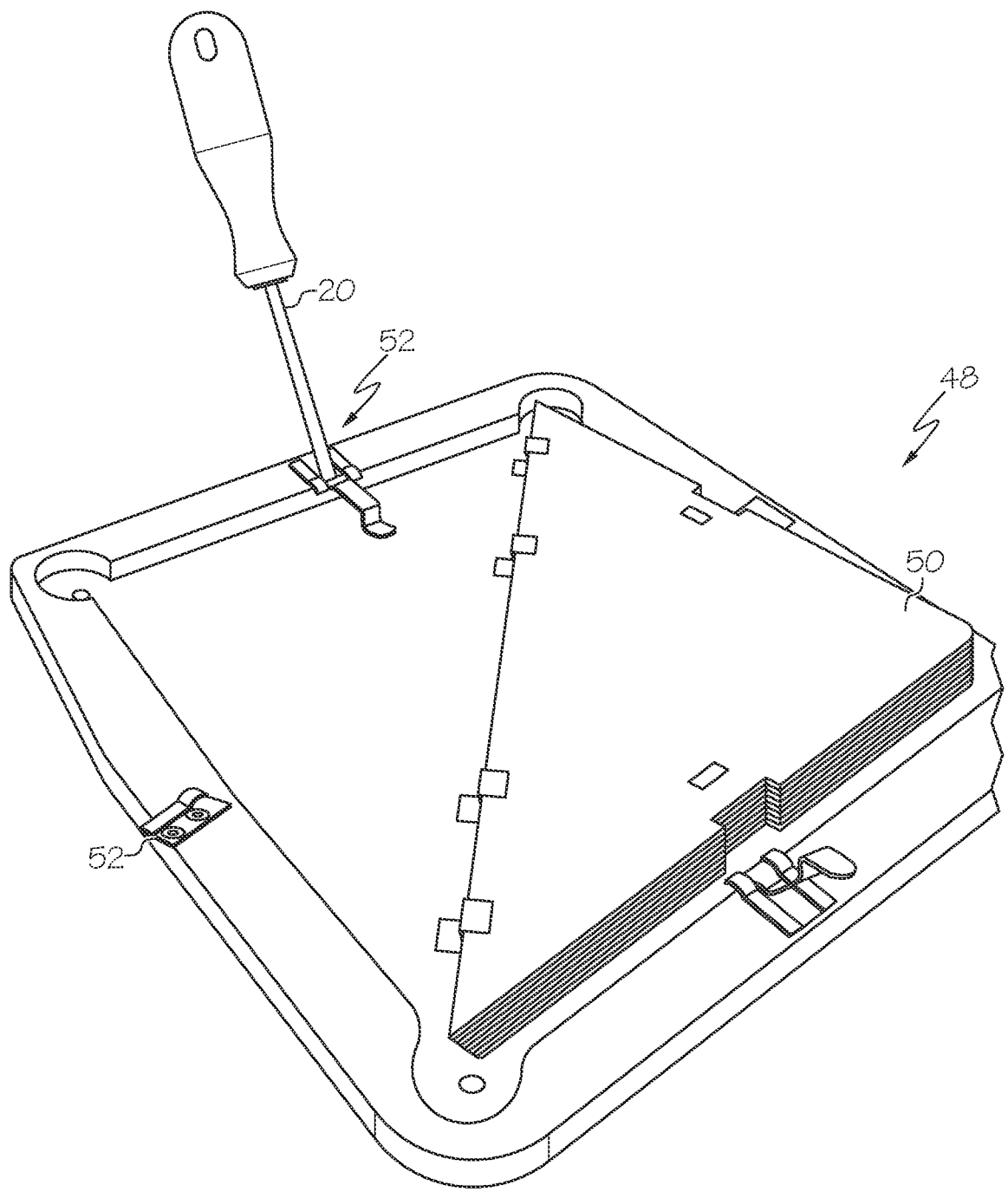
FIG. 6 is top view of the placard tool and a placard assembly.
Figure 7:
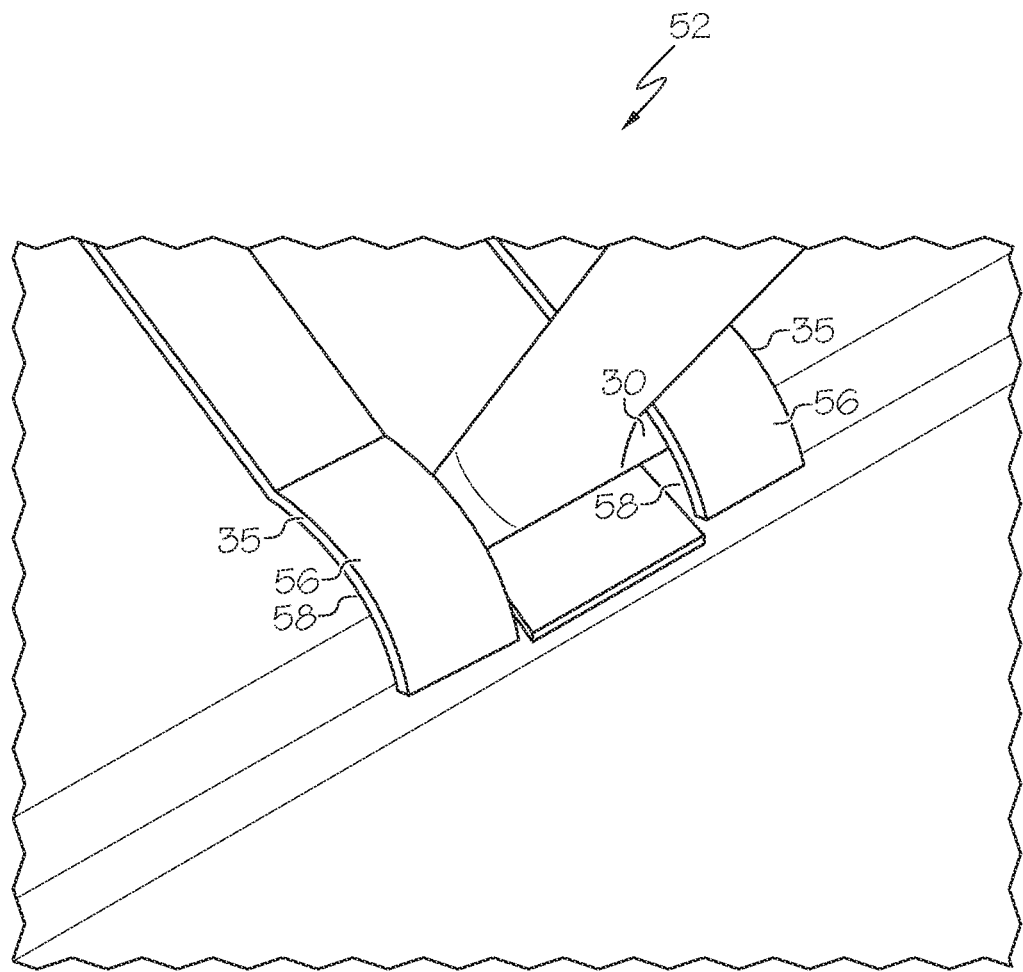
FIG. 7 is a partial view of a placard tool positioned in a pair of clamps.
Figure 8:
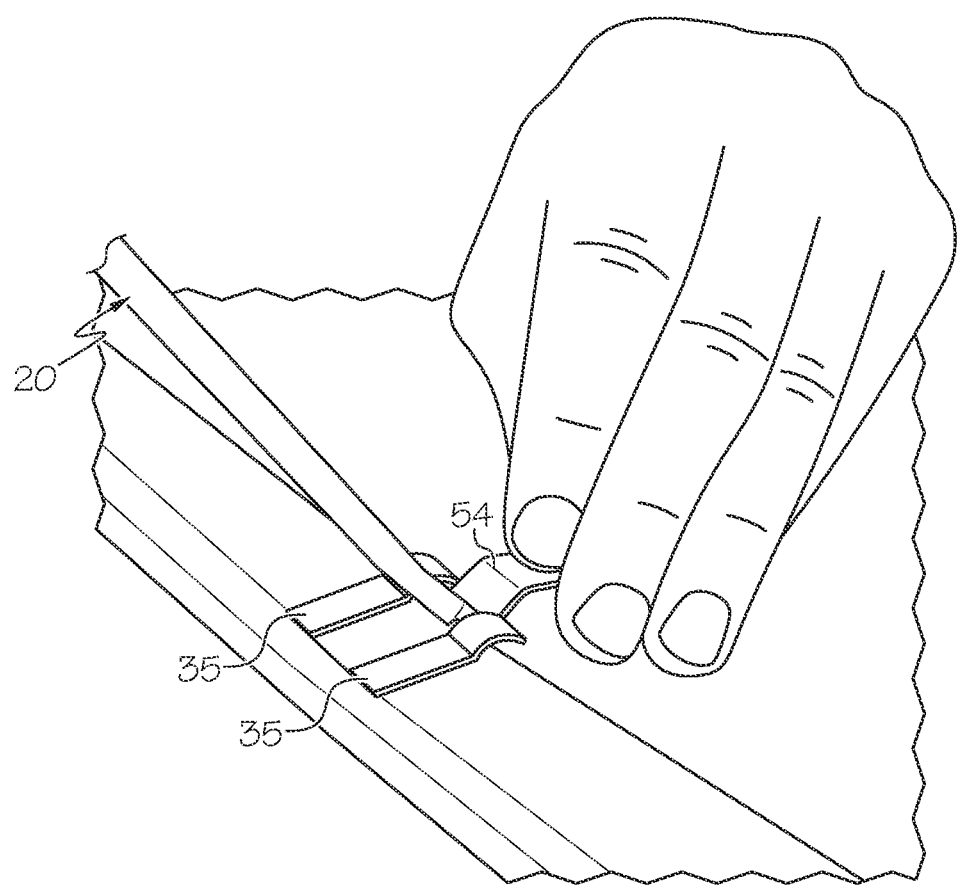
FIG. 8 is a partial view of a placard tool positioned in a pair of clamps with a contact member.
Figure 9:
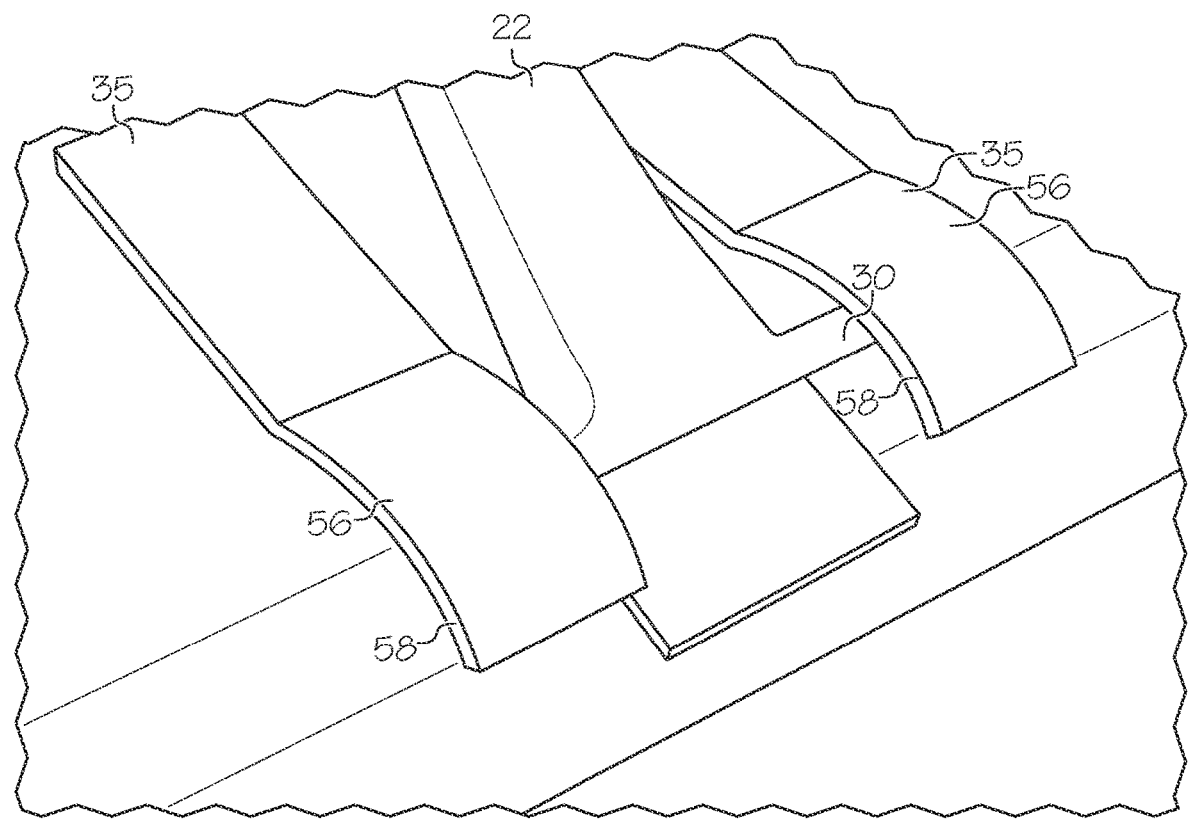
FIG. 9 is a partial view of a placard tool positioned in a pair of clamps and pivoted to remove a contact member.

In a normal operation, the pair of clamps 35 hold the contact member 54. When wishing to change a placard 50, the elongated member 30 of the placard tool 20 is adapted to be inserted within the arcuate portion 56 of the pair of clamps 35. In one aspect, the second end 34 of the elongated member 30 may be inserted into the recess 58 and slid into the arcuate portion 56 of one of the clamps 35. The elongated member 30 may then be moved laterally to insert the first end 32 into the other arcuate portion 56 of the other clamp 35. The unequal length of the first end 32 relative to the second end 34 allows easily lateral movement. The placard tool 20 may be utilized when the contact member 54 is positioned in the clamps 35 as shown in FIGS. 6 and 8. The placard tool 20 may also be utilized when the contact member 54 is not positioned in the clamps 35 as shown in FIGS. 7 and 9.

Figure 10:
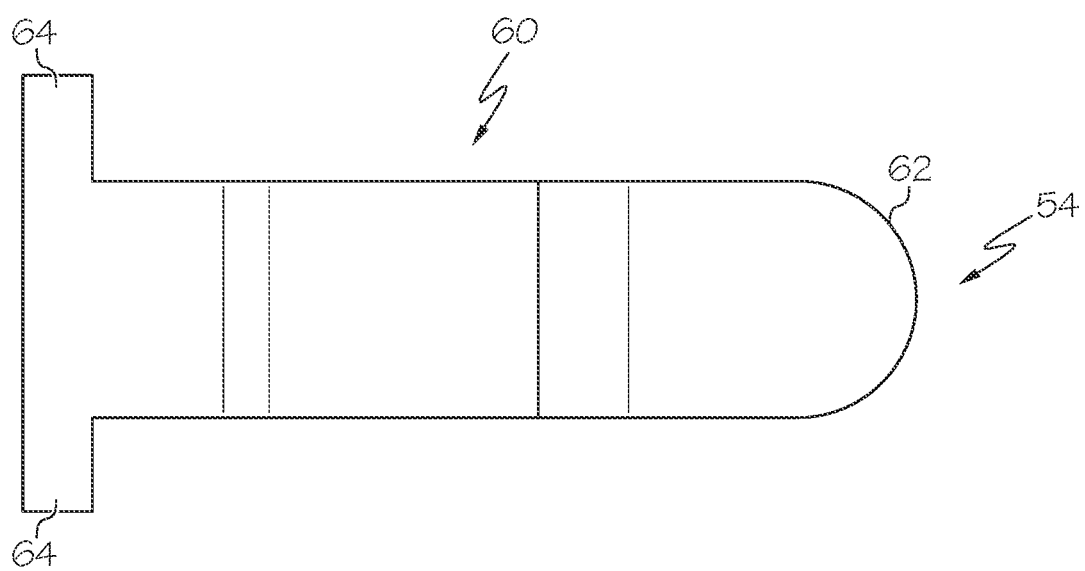
FIG. 10 is a view of a contact member.

Referring to FIG. 10, the contact member 54 includes a body 60 that has a contact end 62 that engages the placard 50. On an opposing end of the body 60, there are formed engagement tabs 64 that are positioned in the recess 58 of each of the clamps 35 during normal operation of the at least one latch 52.

In one aspect, once received in the recess 58 of each of the pair of clamps 35, the elongated member 30 via the handle 28 and the shaft 22 is pulled in a direction away from the placard on the pivot surface 46 to remove the contact member 54 from the clamps thereby relieving the tension on the placard as best seen in FIG. 8. Alternatively, once received in the recess 58 of each of the pair of clamps 35, the elongated member 30 via the handle 28 and the shaft 22 is pulled in a direction away from the placard 50 on the pivot surface 46 to allow the contact member 54 to be inserted in the recess 58 as best seen in FIG. 9.

The placard tool 20 including the offset in the first direction B allows the elongated member 30 to be easily inserted between the clamps 35 and span both of the clamps 35 to allow simultaneous contact on both of the clamps 35. The placard tool 20 including the offset in the second direction C allows the elongated member 30 to be positioned in the clamps 35 such that pivotal movement from the handle 28 about the pivot surface 46 pries the clamps 35 simultaneously upward to either relive tension on the contact member 54 or allow the contact member 54 to be inserted into the clamps 35. The placard tool 20 satisfies a need in the art and avoids a difficult changing procedure trying to use a knife or screw driver to pry the clamps upward.

The invention claimed is:

1. A placard tool comprising:
    a shaft having a distal end spaced from a proximal end, the shaft including a longitudinal axis A;
    a handle is positioned at the proximal end of the shaft;
    an elongated member positioned at the distal end of the shaft, the elongated member includes a first end and an opposite second end;
    wherein the elongated member is offset in a first direction B from the axis A of the shaft defining an unequal length of the elongated member with reference to the axis A on the second end in comparison to the first end and the elongated member is offset in a second direction C from the axis A of the shaft, the second direction C being perpendicular to the first direction B.

2. The placard tool of claim 1 wherein the elongated member is positioned at the distal end of the shaft between the first end and the second end such that the elongated member is positioned perpendicular to the axis A of the shaft.

3. The placard tool of claim 2 wherein the elongated member is coupled to the distal end of the shaft via a weld.

4. The placard tool of claim 2 wherein the elongated member is coupled to the distal end of the shaft using epoxy or a fastener.

5. The placard tool of claim 1 wherein each or both of the first end and the second end include tapers.

6. The placard tool of claim 1 wherein the shaft includes a radius formed thereon on an opposing side of the axis A relative to the elongated member defining a pivot surface.

7. A placard tool configured to interact with a placard assembly, the placard tool comprising:
    a shaft having a distal end spaced from a proximal end, the shaft including a longitudinal axis A;
    a handle is positioned at the proximal end of the shaft;
    an elongated member positioned at the distal end of the shaft, the elongated member includes a first end and an opposite second end, the elongated member generally having a uniform diameter therebetween to interact with the placard assembly;
    wherein the elongated member is offset in a second direction C from the axis A of the shaft positioning the elongated member on one side with reference to the axis A.

8. The placard tool of claim 7 wherein the elongated member is positioned at the distal end of the shaft between the first end and the second end such that the elongated member is positioned perpendicular to the axis A of the shaft.

9. The placard tool of claim 8 wherein the elongated member is coupled to the distal end of the shaft via a weld.

10. The placard tool of claim 8 wherein the elongated member is coupled to the distal end of the shaft using epoxy or a fastener.

11. The placard tool of claim 7 wherein each or both of the first end and the second end include tapers.

12. The placard tool of claim 7 wherein the shaft includes a radius formed thereon on an opposing side of the axis A relative to the elongated member defining a pivot surface.

13. A placard tool configured to interact with a placard assembly, the placard tool comprising:
    a shaft having a distal end spaced from a proximal end, the shaft including a longitudinal axis A;
    a handle is positioned at the proximal end of the shaft;
    an elongated member positioned at the distal end of the shaft, the elongated member includes a first end and an opposite second end, the elongated member generally having a uniform diameter therebetween to interact with the placard assembly;
    wherein the elongated member is offset in a first direction B from the axis A of the shaft defining an unequal length of the elongated member with reference to the axis A on the second end in comparison to the first end; and
    wherein the elongated member is offset in a second direction C from the axis A of the shaft positioning the elongated member on one side with reference to the axis A.

14. The placard tool of claim 13 wherein the elongated member is positioned at the distal end of the shaft between the first end and the second end such that the elongated member is positioned perpendicular to the axis A of the shaft.

15. The placard tool of claim 14 wherein the elongated member is coupled to the distal end of the shaft via a weld.

16. The placard tool of claim 14 wherein the elongated member is coupled to the distal end of the shaft using epoxy or a fastener.

17. The placard tool of claim 14 wherein the elongated member is integrally formed with the shaft as a monolithic structure.

18. The placard tool of claim 13 wherein each or both of the first end and the second end include tapers.

19. The placard tool of claim 13 wherein the shaft includes a radius formed thereon on an opposing side of the axis A relative to the elongated member defining a pivot surface.

\* \* \* \* \*